US012808747B2

(12) United States Patent
Chiu et al.

(10) Patent No.: US 12,808,747 B2
(45) Date of Patent: Nov. 24, 2026

(54) SYSTEM AND METHOD FOR CALIBRATION OF OPTICAL MEASUREMENT DEVICES USING PUPIL COINCIDENCE

(71) Applicant: CHROMA ATE INC., Taoyuan City (TW)

(72) Inventors: I-Chang Chiu, Taoyuan City (TW); Hung-Ta Chien, Taoyuan City (TW); Yu-Shuan Lin, Taoyuan City (TW); Shih-Min Hsu, Taoyuan City (TW); Li-Yang Chen, Taoyuan City (TW); Tsung-Hsien Ou, Taoyuan City (TW)

(73) Assignee: CHROMA ATE INC., Taoyuan City (TW)

( * ) Notice: Subject to any disclaimer, the term of this patent is extended or adjusted under 35 U.S.C. 154(b) by 80 days.

(21) Appl. No.: 18/931,867

(22) Filed: Oct. 30, 2024

(65) Prior Publication Data

US 2025/0155319 A1 May 15, 2025

(30) Foreign Application Priority Data

Nov. 15, 2023 (TW) ................................ 112144160

(51) Int. Cl.
*G01M 11/02* (2006.01)
*H04N 13/327* (2018.01)

(52) U.S. Cl.
CPC .... *G01M 11/0257* (2013.01); *G01M 11/0207* (2013.01); *H04N 13/327* (2018.05)

(58) Field of Classification Search
CPC ......... G01M 11/0257; G01M 11/0207; G01M 11/0264; H04N 13/327; G01B 11/2504; G01J 3/10; G01J 3/463; G03B 23/105
See application file for complete search history.

(56) References Cited

U.S. PATENT DOCUMENTS

| | | | | |
|---|---|---|---|---|
| 10,685,431 | B1 * | 6/2020 | Geng | G06T 5/80 |
| 2018/0109783 | A1 * | 4/2018 | Austin | G01M 11/04 |
| 2018/0128685 | A1 * | 5/2018 | Peloux | G01M 11/0257 |
| 2020/0033595 | A1 * | 1/2020 | Stegelmeier | G02B 27/0081 |
| 2020/0080913 | A1 * | 3/2020 | Tilleman | G02B 13/22 |
| 2024/0159620 | A1 * | 5/2024 | Ruiz | G01M 11/0207 |
| 2024/0402613 | A1 * | 12/2024 | Winkler | G03F 7/701 |

FOREIGN PATENT DOCUMENTS

| | | | | |
|---|---|---|---|---|
| CN | 107884160 A * | 4/2018 | | G01M 11/00 |

* cited by examiner

*Primary Examiner* — Michael P LaPage
(74) *Attorney, Agent, or Firm* — Birch, Stewart, Kolasch & Birch, LLP

(57) ABSTRACT

A system and a method for calibration of optical measurement devices are described. In one embodiment, the optical measurement device comprises an imaging lens, and the calibration system includes a projection light source, a lens module, and a projection element. The light emitted from the projection light source passes through the projection element and is projected by the lens module, and then captured by the imaging lens of the optical measurement device. The exit pupil of the lens module in the calibration system is coincident with the entrance pupil of the imaging lens of the optical measurement device, providing a compact and highly efficient optical calibration mechanism.

9 Claims, 5 Drawing Sheets

SYSTEM AND METHOD FOR CALIBRATION OF OPTICAL MEASUREMENT DEVICES USING PUPIL COINCIDENCE

CROSS-REFERENCE TO RELATED APPLICATION

This non-provisional application claims priority under 35 U.S.C. § 119 (a) to patent application No. 112144160 filed in Taiwan, R.O.C. on Nov. 15, 2023, the entire contents of which are hereby incorporated by reference.

BACKGROUND

Technical Field

The present disclosure relates to a system and a method for calibration of optical measurement devices, and in particular, to a calibration system and method, which can provide a standard image for an optical measurement device to be calibrated, facilitating analysis and calibration on a measurement result of the optical measurement device.

Related Art

Optical measurement devices (Colorimeters) are commonly used for measuring various display performance of light sources of various displays and lighting devices. For example, they can provide measurements of various optical characteristics such as chromaticity, luminance, contrast, uniformity, and correlated color temperature of various displays.

However, when the measurement results of the optical measurement device become abnormal and recalibration is needed, or when there is a need for regular calibration, the device typically has to be disassembled from the machine and sent back to the manufacturer for calibration, or moved to a professional laboratory with fewer space constraints for recalibration. This process is often time-consuming. The reason is that the calibration process requires preparation of an integrating sphere and specific physical images, and this calibration must take place in a relatively large space. For example, the imaging lens may need to be positioned 10 meters away from the object being measured, which means that the specific physical image must be extremely large in size.

It is evident that traditional calibration methods are quite cumbersome and are limited by space and equipment. Therefore, a technology that allows on-site (in-situ) calibration directly on the original machine, reducing the space and time required for calibration, and enabling various calibrations on a single machine, is highly anticipated by the industry.

SUMMARY

In view of this, embodiments of the present disclosure provide a system and a method for calibration of optical measurement devices, which can completely solve the problems of the above-mentioned conventional technology.

An embodiment of the present disclosure provides a system for calibration of an optical measurement device. The optical measurement device includes an imaging lens. The calibration system includes a standard projection device, and the device comprises (but is not limited to): a projection light source, a lens module, and at least one projection element. An optical axis of the lens module is aligned with an optical axis of the imaging lens, and the at least one projection element is located between the projection light source and the lens module. The light emitted from the projection light source passes through the at least one projection element and is projected by the lens module, and then captured by the imaging lens of the optical measurement device. An exit pupil of the lens module of the standard projection device is coincident with an entrance pupil of the imaging lens of the optical measurement device.

An embodiment of the present disclosure provides a method for calibration of an optical measurement device. The optical measurement device includes an imaging lens. The method includes (but is not limited to) the following steps: firstly, aligning an optical axis of a standard projection device with an optical axis of the imaging lens, and making an exit pupil of the standard projection device to be coincident with an entrance pupil of the optical measurement device; then, projecting a standard image by the standard projection device, and capturing the standard image by the optical measurement device; and performing at least one of analyzing and calibrating the captured standard image by the optical measurement device.

Based on the above, according to the system and the method for calibration of optical measurement devices in some embodiments, it is possible to directly perform on-site (in-situ) calibration Quality Control Management (QCM) of the optical measurement device on the machine without needing to disassemble the device and send it back to the manufacturer. This approach also eliminates the need for the large space required by traditional calibration methods and significantly reduces the calibration time.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1A:
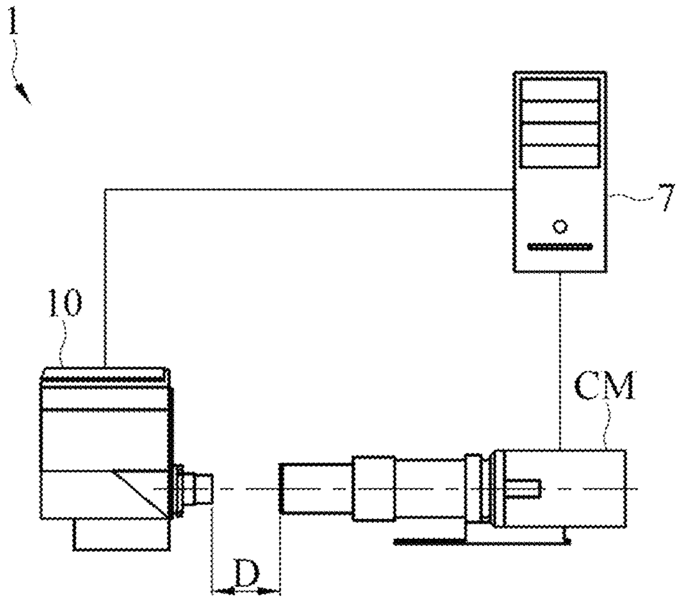
FIG. 1A is an architecture diagram of an embodiment of the present disclosure.

Various embodiments are presented below for detailed description, and the embodiments are only used as examples and do not limit the scope of protection of the present disclosure. In addition, some elements are omitted in the drawings in the embodiments to clearly show the technical features of the present disclosure. Furthermore, the same reference numerals will be used for representing the same or similar elements in all drawings, and the drawings of the present disclosure are only for exemplary illustration, which may not be necessarily drawn to scale, and not all details are necessarily presented in the drawings.

Figure 1B:
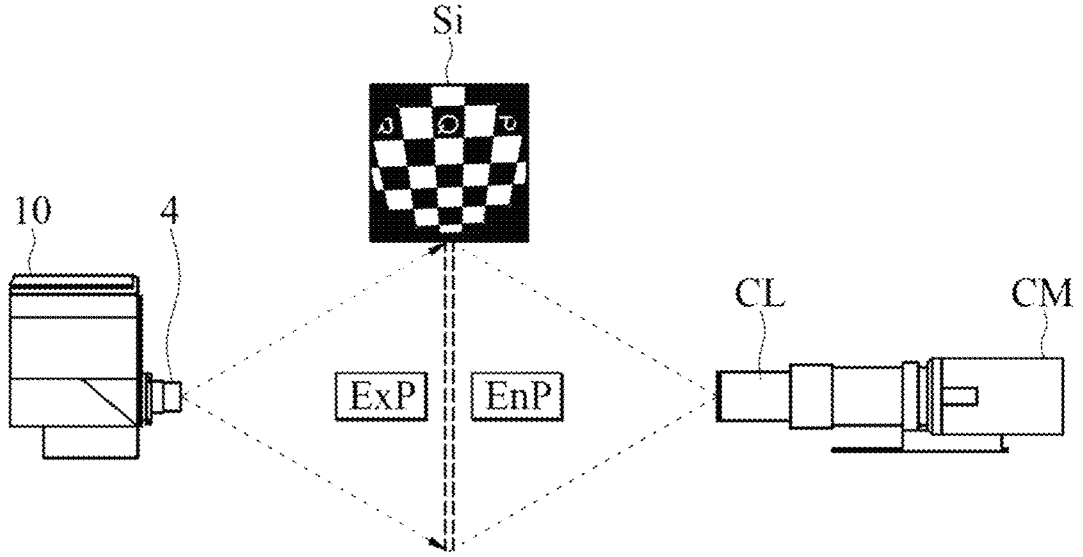
FIG. 1B is a schematic diagram of an embodiment of the present disclosure.
Figure 1C:
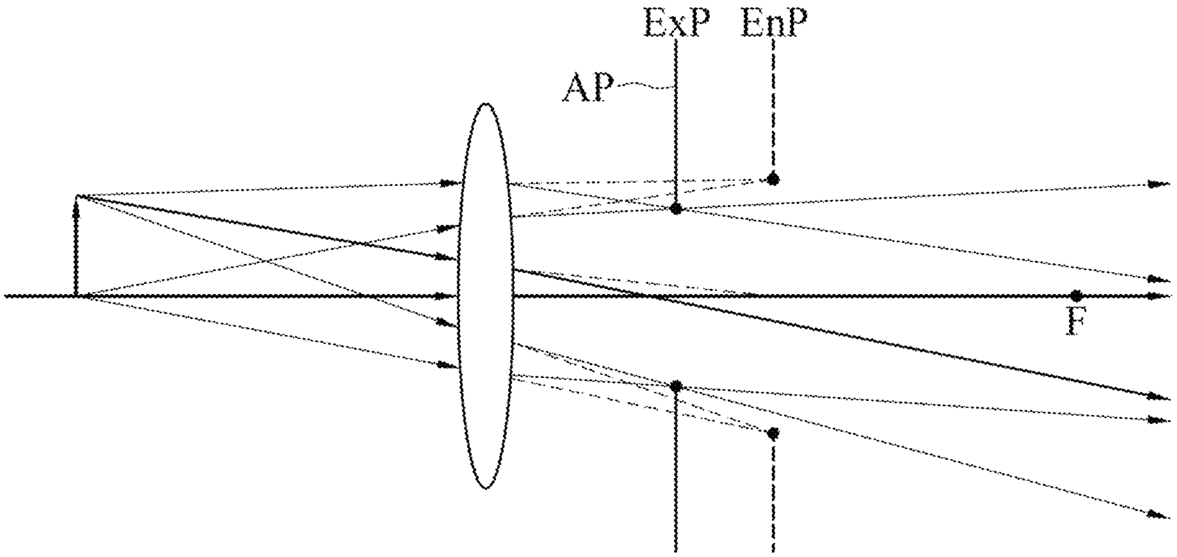
FIG. 1C is a schematic diagram of an exit pupil and an entrance pupil in an optical system.
Figure 2A:
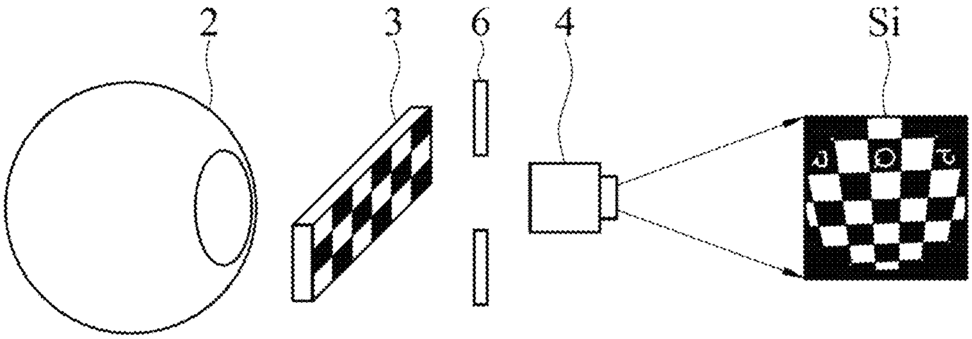
FIG. 2A is a schematic diagram of a standard projection device according to an embodiment of the present disclosure.
Figure 2B:
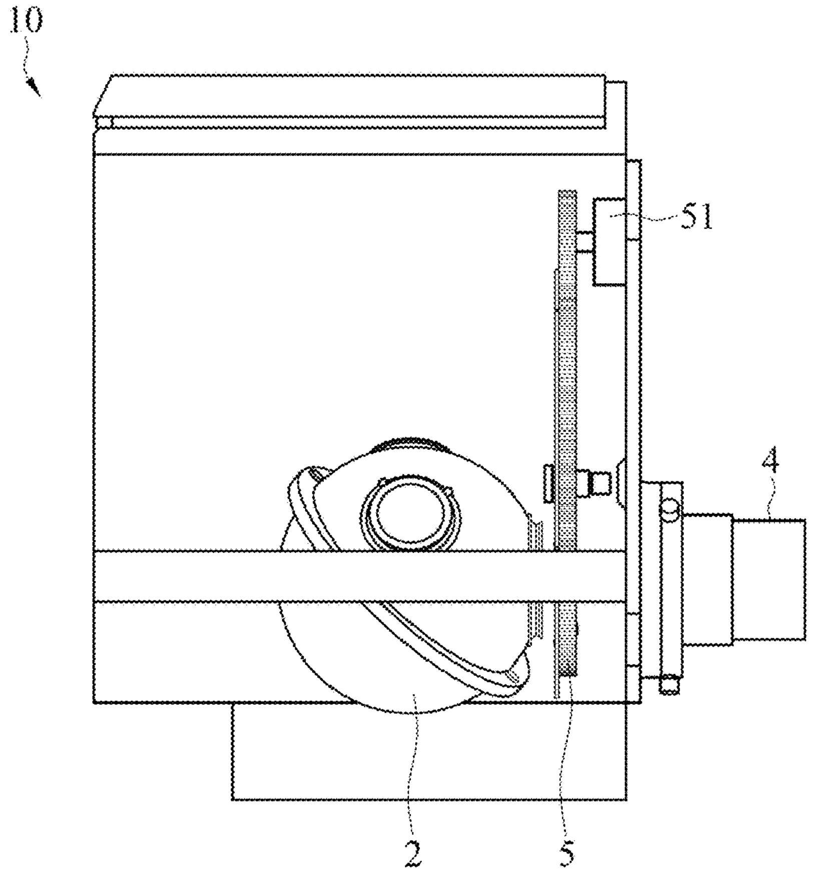
FIG. 2B is a sectional view of a standard projection device according to an embodiment of the present disclosure.

Referring to FIG. 1A, FIG. 1B, FIG. 1C, FIG. 2A, and FIG. 2B. FIG. 1A is an architecture diagram of an embodiment of the present disclosure, FIG. 1B is a schematic diagram of an embodiment of the present disclosure, FIG. 1C is a schematic diagram of an exit pupil ExP and an entrance pupil EnP in an optical system, FIG. 2A is a schematic diagram of a standard projection device 10 according to an embodiment of the present disclosure, and FIG. 2B is a sectional view of a standard projection device 10 according to an embodiment of the present disclosure.

It should first be noted that FIG. 1B merely illustrates, in a schematic form, the concept of the exit pupil ExP of the standard projection device 10 being coincident with the entrance pupil EnP of the optical measurement device CM. This figure is not a depiction of an actual optical system configuration. Similarly, FIG. 2A only schematically presents a relative position relationship of the main components inside the standard projection device 10, as well as the projection effect of the standard image Si related to the projection element 3 within the standard projection device 10. It is not an actual configuration diagram of the internal components of the standard projection device 10. Moreover, in FIG. 2A, for the sake of clearly presenting the projection relationship among the projection light source 2, the projection element 3, and the standard image Si, the arrangement orientations of the projection light source 2 and the projection element 3 differs from that of other components shown in the figure Furthermore, the optical measurement device mentioned in the following embodiments may be specialized equipment for measuring or inspecting the display performance of near-eye display devices (NED), such as augmented reality (AR), virtual reality (VR), and mixed reality (MR) devices. However, the scope is not limited to this; the calibration system and method of the present disclosure are applicable to any optical measurement device capable of measuring optical characteristics such as chromaticity, luminance, contrast, uniformity, and correlated color temperature of various displays, lighting devices, or any other light-emitting devices.

In addition, the optical measurement device CM in the embodiment includes an imaging lens CL, which may consist of optical components such as a macro lens, a baffle, an aperture assembly, and an eyepiece.

As shown in the figure, in one embodiment of the present disclosure, the calibration system 1 for an optical measurement device may include the standard projection device 10 and a main controller 7. The standard projection device 10 may further comprise: a projection light source 2, a lens module 4, a turntable 5, a driver 51, and an aperture assembly 6. The projection light source 2 is a standard projection light source capable of providing a uniform light source (RGBW), such as an integrating sphere light source. The lens module 4 can be a projection lens including lens components such as the macro lens and the baffle.

Figure 3:
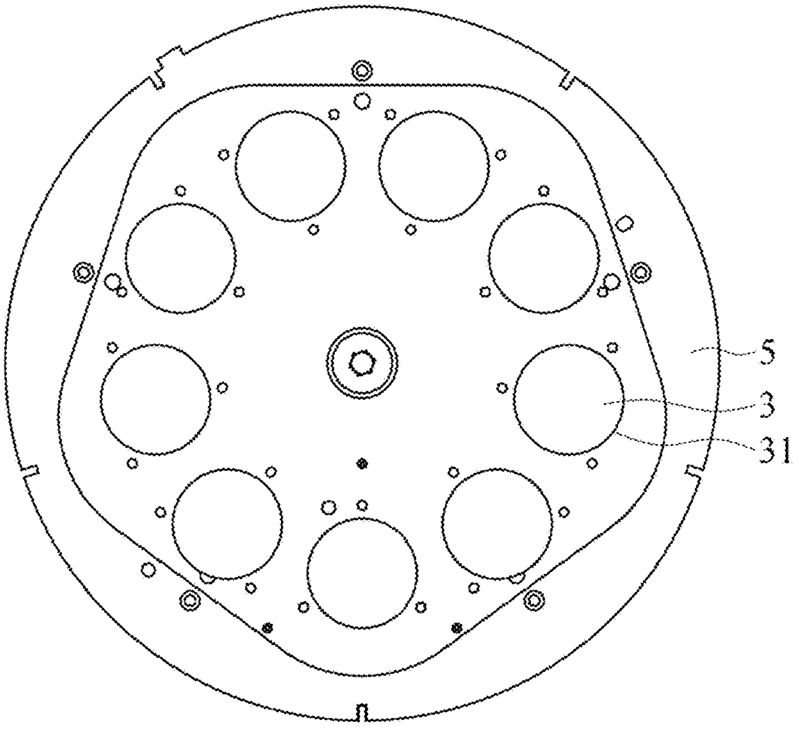
FIG. 3 is a front view of a turntable according to an embodiment of the present disclosure.

Referring to FIG. 3, which is a front view of a turntable 5 according to an embodiment of the present disclosure. In one embodiment of the present disclosure, the turntable 5 is provided with a plurality of apertures 31, and various projection elements 3 can be placed within the aperture. Examples include monochrome (black, white, gray) projection elements, black-and-white checkerboard projection elements, RGB primary color projection elements, and RGB checkerboard projection elements. Each projection element corresponds to at least one calibration item for optical characteristics, which will be detailed later. In other embodiments, one aperture 31 can be arranged in a hollow manner, and no projection element 3 is arranged. In other embodiments, one of the apertures 31 may be left empty without any projection element 3. In some embodiments, the projection element 3 may be a slide with a specific pattern printed on a transparent film.

In addition, the driver 51 is used to drive the turntable 5 to rotate, and is coupled with a reduction gear to allow the projection elements 3 on the turntable 5 to be aligned with the projection light source 2 and the lens module 4. In addition, the aperture assembly 6 is arranged between the turntable 5 and the lens module 4. Therefore, the light emitted from the projection light source 2 can pass through the projection elements 3, and is projected as a standard image Si by the lens module 4 via the aperture assembly 6. The standard image Si is associated with the projection elements 3, that is, the content included in the projection object 3, as schematically shown in FIG. 2A.

Furthermore, the main controller 7 can be any single or multiple processor computing devices or systems capable of executing computer-readable instructions. Examples include, but are not limited to: a workstation, a laptop, a client terminal, a server, or a distributed computing system, a handheld device, or any other computing system or device. In the most basic configuration, the main controller 7 may include at least one processor and a system memory. The main controller 7 is electrically connected to the projection light source 2 and the driver 51 of the standard projection device 10, and the optical measurement device CM. The main controller 7 is mainly used to control the activation or deactivation of the projection light source 2 and the driver 51, as well as to control the optical measurement device CM in capturing and analyzing the standard image Si.

The calibration principle in one embodiment of the present disclosure accords with at least the following two prerequisites: (1) the optical axis of the lens module 4 is aligned with the optical axis of the imaging lens CL; and (2) the exit pupil ExP of the lens module 4 is coincident with the entrance pupil EnP of the imaging lens CL.

Regarding prerequisite (1), which is the optical axis alignment between the lens module 4 and the imaging lens CL in a three-dimensional space, the specific alignment steps include: a positioning mark (such as a focusing cross pattern) may be set on the standard projection device 10 in advance; and then by adjusting the position or orientation of the optical measurement device CM, aligning a positioning point in the image captured by the imaging lens CL of the optical measurement device CM with the positioning marker on the standard projection device 10; in which the positioning point can also be another focusing cross pattern.

Regarding prerequisite (2), this can be achieved after the optical axis alignment of prerequisite (1) by adjusting the horizontal axial distance between the standard projection device 10 and the optical measurement device CM. In one embodiment, this adjustment is made by moving the standard projection device 10 closer to or farther from the imaging lens CL. As for determining whether the exit pupil ExP of the lens module 4 is coincident with the entrance pupil EnP of the imaging lens CL, this can be judged by the size of the image (field of view, FOV) captured by the optical measurement device CM. When the image size (FOV) reaches a preset value, it can be determined that the exit pupil ExP of the lens module 4 is coincident with the entrance pupil EnP of the imaging lens CL.

Referring to FIG. 1C. The "exit pupil ExP" can be defined as the effective aperture that limits the outgoing light beam, which is the image formed by the aperture stop AP on the rear optical system. More simply, the exit pupil ExP determines the angular range of the light exiting the optical system. The term "entrance pupil EnP" can be defined as the image of the aperture stop AP formed in object space by the preceding lens group in the optical system, with its primary function being to limit the effective aperture of the incoming light beam. More simply, the entrance pupil EnP determines the angular range of the light entering the optical system. The point labeled "F" in FIG. 1C represents the focal point.

In one embodiment of the present disclosure, since the optical measurement device CM is used to measure a near-eye display devices (not shown in the figure), its imaging focal position is set at infinity, and the entrance pupil EnP of the imaging lens CL is preset to be 1 cm to 2 cm in front of the lens, similar to the distance between the display module and the human eye when a near-eye display device is worn by a user. On the other hand, the projection imaging position of the lens module 4 of the standard projection device 10 is also set to infinity, so the exit pupil ExP of the lens module 4 is also positioned 1 cm to 2 cm in front of the lens. In some embodiments, achieving the coincidence of the exit pupil ExP of the lens module 4 with the entrance pupil EnP of the imaging lens CL, as shown by distance D in FIG. 1A, can be accomplished simply by positioning the lens module 4 and the imaging lens CL 1 cm to 2 cm apart.

Figure 4:
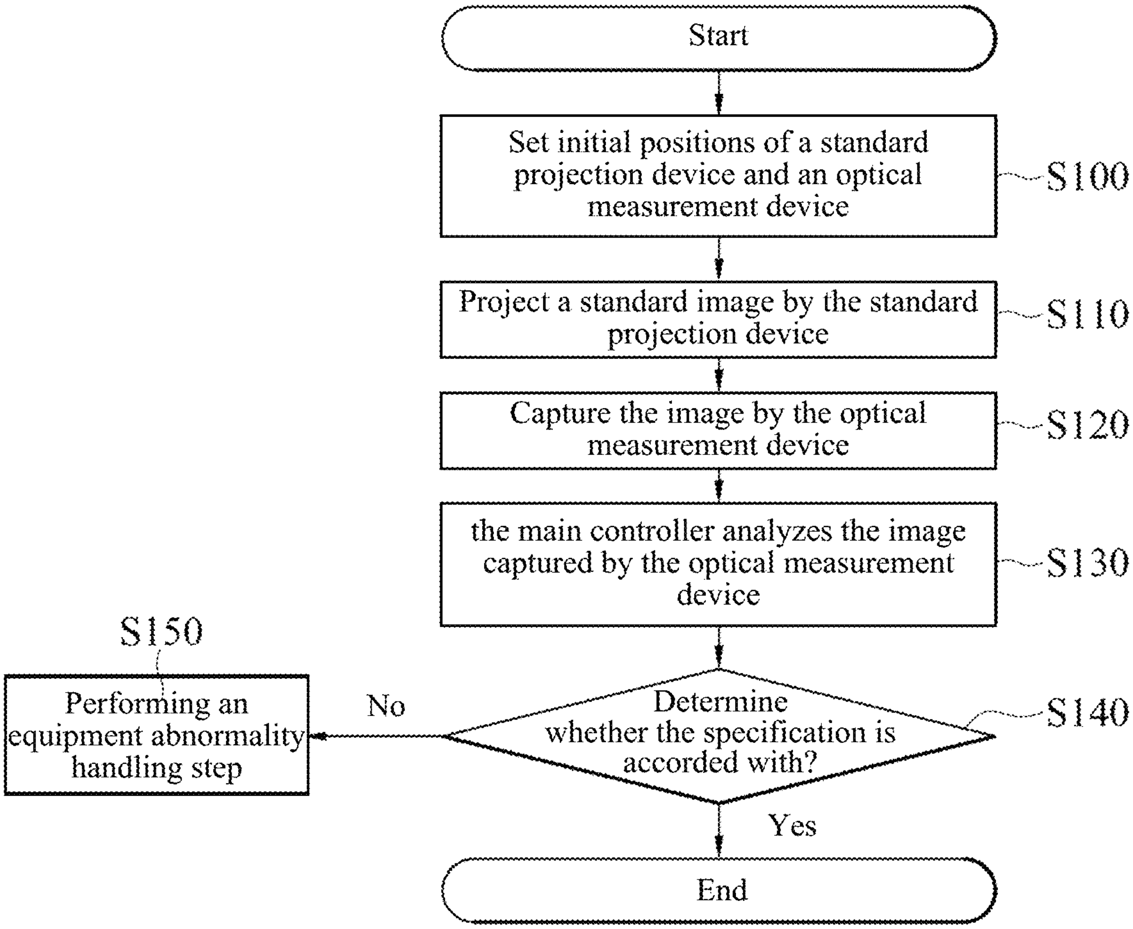
FIG. 4 is a flowchart of a method for inspecting a measurement quality of an optical measurement device according to an embodiment of the present disclosure.

Referring to FIG. 4, which is a flowchart of a method for inspecting a measurement quality of an optical measurement device CM according to an embodiment of the present disclosure. The following describes the on-site (in-situ) calibration inspection steps of measurement quality in one embodiment. Step S100: initial positions of the standard projection device 10 and the optical measurement device CM are set. Specifically, the optical axis of the lens module 4 is aligned with the optical axis of the imaging lens CL; and the exit pupil ExP of the lens module 4 is made to coincide with the entrance pupil EnP of the imaging lens CL.

Then, the main controller 7 controls the standard projection device 10 to project a standard image Si, which is associated with a quality item to be inspected as described in step S110. On the other hand, the main controller 7 controls the optical measurement device CM to capture the standard image Si, as described in step S120. Then, the main controller 7 analyzes the image captured by the optical measurement device CM and determines whether the image accords with the specification, as described in step S130 and step S140.

If the measurement meets the specifications, the inspection process for this measurement quality item is terminated, and the inspection process for the next measurement quality item can be performed. In some embodiments, the driver 51 can drive the turntable 5 to rotate so that another projection element 3 is aligned with the projection light source 2 and the lens module 4, and steps S110 to S140 are repeated. However, if the specifications are not met, step S150, the equipment abnormality handling step, is performed, in which the main controller 7 records and reports an abnormal status, and the use of the optical measurement device CM is temporarily suspended.

Figure 5:
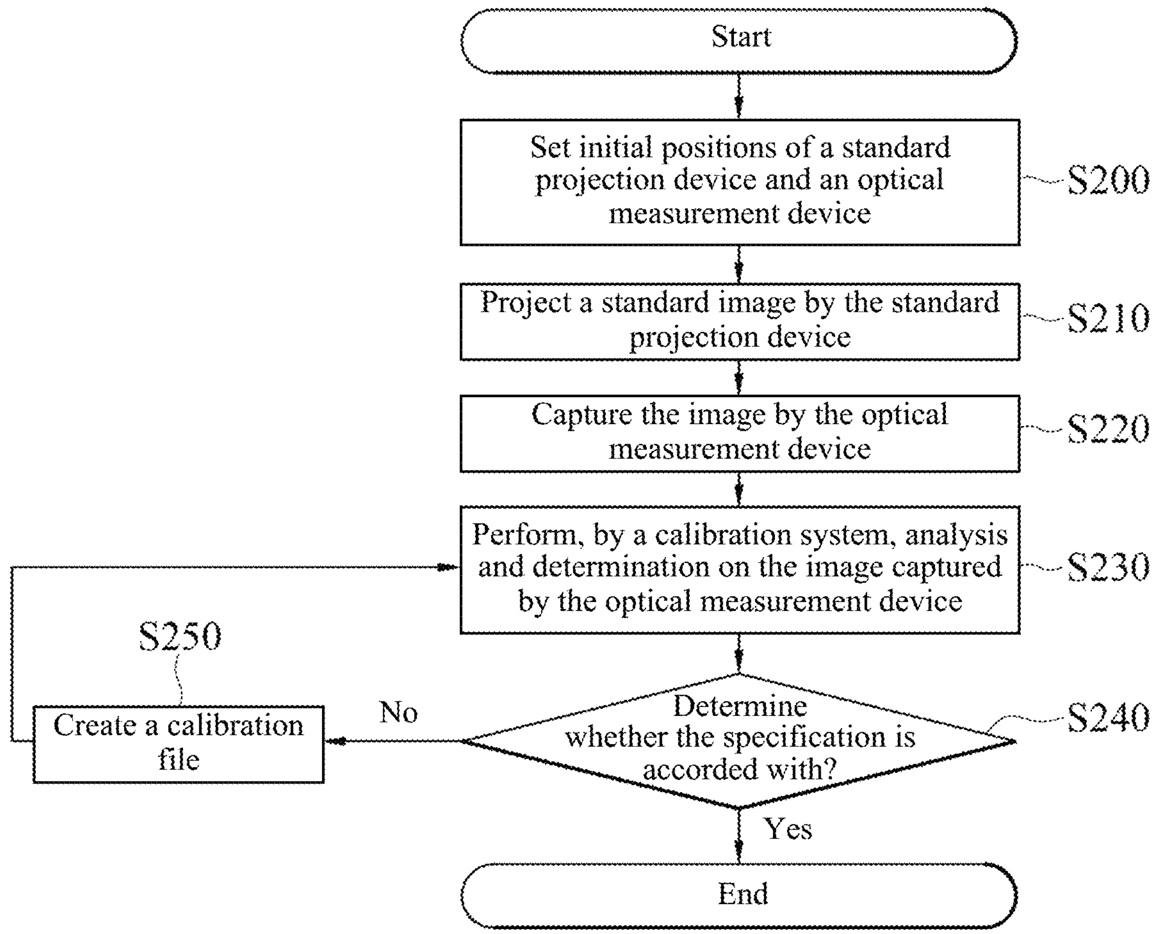
FIG. 5 is a flowchart of a method for calibrating the measurement quality of an optical measurement device according to an embodiment of the present disclosure.

Continuing referring to FIG. 5, which is a flowchart of a method for calibrating the measurement quality of an optical measurement device according to an embodiment of the present disclosure. The main difference between the method for calibrating in the present embodiment and the method for inspecting in the above-mentioned embodiment is that this embodiment can establish a calibration file for measurement quality items that do not meet the specifications for subsequent calibration, as shown in step S250. In other embodiments, the main controller 7 can also directly perform automatic adjustment on the measurement items that do not meet the specifications, such as automatically compensating (digital processing) for subsequent captured images, thereby realizing an automatic calibration function. As for the other steps, they are the same as those in the previous embodiments, and will not be described in detail.

The following describes the image analysis items in steps S130 and S230 of the aforementioned embodiments and the corresponding projection element settings. Regarding defective pixel calibration, the standard projection device 10 projects a pure-color standard image Si using a monochrome (such as black, white, gray, red, blue, or green) projection element, and the optical measurement device CM captures the image. If the main controller 7 determines that the captured image shows a local pixel area with a display mode different from that of other areas, the main controller 7 can determine that the local pixel area is a defective pixel area For luminance analysis calibration and uniformity analysis calibration, the standard projection device 10 can utilize a monochrome (e.g., white) projection element or a projection element with a perforated configuration to project a pure-color (e.g., white, red, blue, or green) standard image Si. The optical measurement device CM then captures the image. Subsequently, the main controller 7 measures the luminance value of the received image and the uniformity of the overall image luminance to determine whether the inspection results meet the standard specifications.

For distortion analysis calibration, the standard projection device 10 can utilize a projection element 3 with a checkerboard pattern to project a standard image Si with a checkerboard pattern (as shown in FIG. 2A), which is then captured by the optical measurement device CM. In some embodiments, the projection element 3 with a checkerboard pattern can also take the form of a reticle. When light passes through the reticle, bright light spots appear, and when light cannot pass through the reticle, dark spots appear. Subsequently, the main controller 7 analyzes the captured image to determine whether the boundaries of the checkerboard pattern are distorted or deformed, and thereby determines whether the inspection results meet the standard specifications. Furthermore, in other embodiments, the main controller 7 can also perform an automatic correction function, that is, using software algorithms to process the distorted and deformed portions of the image to make them appear like the checkerboard pattern in the standard image Si.

For Field of View (FOV) analysis calibration, the standard projection device 10 can similarly utilize a projection element 3 with a checkerboard pattern to project a standard image Si with a checkerboard pattern (as shown in FIG. 2A), which is then captured by the optical measurement device CM. Similarly, in some embodiments, the projection element 3 with a checkerboard pattern can also take the form of a reticle. When light passes through the reticle, bright light spots appear, and when light cannot pass through the reticle, dark spots appear. Subsequently, the main controller 7 analyzes the size and quantity of the checkerboard pattern in the captured image to determine whether the field of view of the optical measurement device CM meets the standard specifications.

Chromaticity analysis and calibration and hue analysis and calibration: the standard projection device 10 can project a pure color standard image Si such as red, green, or blue, use a red, green, or blue (RGB) three-color pure-color projection element, or utilize a hollow configuration to directly project a pure-color image through an integrating sphere light source (the projection light source 2), and the image is captured through the optical measurement device CM; and then, the main controller 7 can analyze the chromaticity and hue of the received pure-color standard image Si, and accordingly determine whether the inspection result accords with the standard specification. For chromaticity and hue analysis calibrations, the standard projection device 10 can project pure-color standard images Si in red, green, or blue. These pure-color images can be projected through red, green, and blue (RGB) projection elements, or alternatively, a perforated configuration can be used to directly project the pure-color images from an integrating sphere light source (projection light source 2). Subsequently, the optical measurement device CM captures the image, and the main controller 7 analyzes the chromaticity and hue of the received pure-color standard image Si to determine whether the inspection results meet the standard specifications.

For color shift analysis calibration, the standard projection device 10 can utilize a projection element 3 with an RGB (red, green, and blue) checkerboard pattern to project a standard image Si with an RGB checkerboard pattern. In some embodiments, the RGB checkerboard pattern projection element 3 can also take the form of a reticle. The projection light source 2 directly emits red, green, or blue light; when the red, green, or blue light passes through the reticle, a bright spot of the corresponding color appears, and when the light cannot pass through the reticle, a dark spot appears. Subsequently, the main controller 7 analyzes the captured image to determine whether there is any color shift, and thereby determines whether the inspection results meet the standard specifications. In particular, the edges of the checkerboard pattern can be specifically identified and analyzed, as color shifts are more easily observed at these locations.

For system resolution analysis calibration, the standard projection device 10 can utilize a projection element 3 with a checkerboard pattern to project a standard image Si with a checkerboard pattern (as shown in FIG. 2A), which is then captured by the optical measurement device CM. Similarly, in some embodiments, the projection element 3 with a checkerboard pattern can also take the form of a reticle. When light passes through the reticle, bright light spots appear, and when light cannot pass through the reticle, dark spots appear. Subsequently, the main controller 7 analyzes the resolution of the captured image to determine whether the inspection results meet the standard specifications.

For system position and orientation (offset & rotation) analysis calibration, the standard projection device 10 can similarly utilize a projection element 3 with a checkerboard pattern to project a standard image Si with a checkerboard pattern (as shown in FIG. 2A), which is then captured by the optical measurement device CM. Similarly, in some embodiments, the projection element 3 with a checkerboard pattern can also take the form of a reticle. When light passes through the reticle, bright light spots appear, and when light cannot pass through the reticle, dark spots appear. Subsequently, the main controller 7 analyzes the captured image to determine whether the checkerboard pattern has undergone any displacement or rotation, thereby determining whether the inspection results meet the standard specifications.

Figure 6:
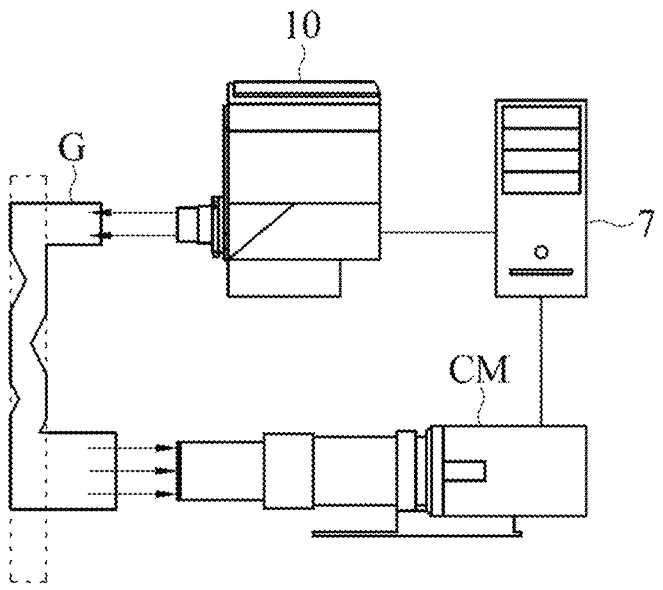
FIG. 6 is a schematic diagram of an optical measurement device with a calibration system according to an embodiment of the present disclosure.

Referring to FIG. 6, which is a schematic diagram of an optical measurement device with a calibration system according to an embodiment of the present disclosure. In this embodiment, the calibration system is integrated with the optical measurement device CM in the same equipment, as shown in the figure. In one embodiment of the present invention, the standard projection device 10 can be placed on one side of the optical measurement device CM, and a light guide plate G or a reflector is configured. When there is a need for measurement quality inspection or calibration, the light guide plate G or the reflector can be moved into position or opened to establish an optical path between the standard projection device 10 and the optical measurement device CM, allowing for subsequent steps such as standard image projection and image acquisition analysis.

Therefore, in some embodiments, on-site (in-situ) calibration quality control (QCM) can be directly implemented on the original inspection machine for the optical measurement device CM, or even automatic calibration can be performed through digital compensation and image processing. Furthermore, the standard projection device 10 and the optical measurement device CM can be docked within a short distance (less than 3 cm), occupying minimal space, as shown in FIG. 1A. On the other hand, multiple quality inspection or calibration items can be measured, and a turntable can be used to quickly switch between inspection items, simplifying the inspection process and enhancing operational efficiency. This significantly reduces downtime.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A system for calibration of an optical measurement device, the optical measurement device comprising an imaging lens, and the calibration system includes a standard projection device comprising:
- a projection light source;
- a lens module, an optical axis of the lens module being aligned with an optical axis of the imaging lens;
- at least one projection element, located between the projection light source and the lens module; and
- a main controller electrically connected to the optical measurement device;
- wherein the light emitted from the projection light source passes through the at least one projection element and is projected by the lens module to form a standard image, and the standard image is then captured by the imaging lens of the optical measurement device; and
- wherein the main controller is configured to determine that an exit pupil of the lens module of the standard projection device is coincident with an entrance pupil of the imaging lens of the optical measurement device when a size of the standard image captured by the optical measurement device reaches a preset value.

2. The system for calibration of an optical measurement device according to claim 1, wherein a projection imaging position of the standard projection device is at infinity, and an imaging focal length position of the optical measurement device is at infinity.

3. The system for calibration of an optical measurement device according to claim 1, wherein the standard projection device further comprising a turntable and a driver, wherein the turntable comprises the at least one projection element, and the driver is adapted to rotate the turntable to align the at least one projection element with the lens module.

4. The system for calibration of an optical measurement device according to claim 3, further comprising the main controller being electrically connected to the projection light source, the driver, and the optical measurement device; wherein the main controller controls activation or deactivation of the projection light source and the driver, and controls the optical measurement device to capture and analyze a standard image; the standard image is formed by the light emitted from the projection light source through passing through the at least one projection element and being projected by the lens module.

5. A method for calibration of an optical measurement device, the optical measurement device comprising an imaging lens, and the method comprising the following steps:

(A) aligning an optical axis of a standard projection device with an optical axis of the imaging lens;

(B) projecting a standard image by the standard projection device, and capturing the standard image by the optical measurement device, wherein when a size of the standard image captured by the optical measurement device reaches a preset value, an exit pupil of the standard projection device is determined to be coincident with an entrance pupil of the optical measurement device; and (C) performing at least one of analyzing and calibrating the captured standard image by the optical measurement device.

6. The method for calibration of an optical measurement device according to claim 5, wherein the standard projection device comprises a projection light source, a lens module, and at least one projection element, the at least one projection element is located between the projection light source and the lens module; the light emitted from the projection light source passes through the at least one projection element and is projected by the lens module to form the standard image; and in step (A), the optical axis of the lens module is aligned with the optical axis of the imaging lens, and the exit pupil of the lens module is coincident with the entrance pupil of the optical measurement device.

7. The method for calibration of an optical measurement device according to claim 6, wherein an imaging position of the standard image projected by the standard projection device is at infinity, and an imaging focal length position of the optical measurement device is at infinity.

8. The method for calibration of an optical measurement device according to claim 6, wherein the standard projection device further comprises a turntable and a driver, the turntable comprises the at least one projection element; after step (A), the method further comprises a step (A1) that the driver rotates the turntable to align the at least one projection element to be aligned with the projection light source; and in step (B), the light emitted from the projection light source passes through the at least one projection element and is projected by the lens module to form the standard image.

9. The method for calibration of an optical measurement device according to claim 5, wherein in step (C), the optical measurement device performs at least one of system resolution analysis and calibration, system offset and rotation analysis and calibration, luminance analysis and calibration, uniformity analysis and calibration, chromaticity analysis and calibration, hue analysis and calibration, hot pixel analysis and calibration, picture distortion analysis and calibration, field of view (FOV) analysis and calibration, and color shift analysis and calibration on the captured image.

* * * * *